May 21, 1940. C. DOERING ET AL 2,201,391
PLASTIC-MATERIAL CUTTING MACHINE
Filed April 4, 1938 6 Sheets-Sheet 1

Inventors
Charles Doering,
Henry H. Doering,
Eric H. Anderson,
Bertil Skoglund.
By George Heidman Attorney.

May 21, 1940.　　　C. DOERING ET AL　　　2,201,391
PLASTIC-MATERIAL CUTTING MACHINE
Filed April 4, 1938　　　6 Sheets-Sheet 6
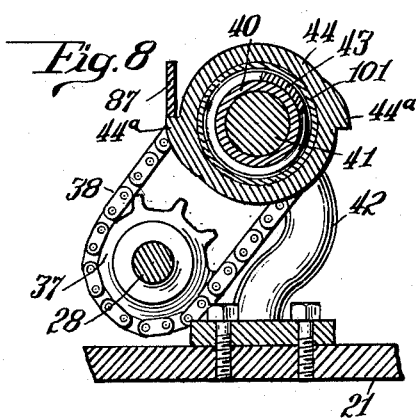
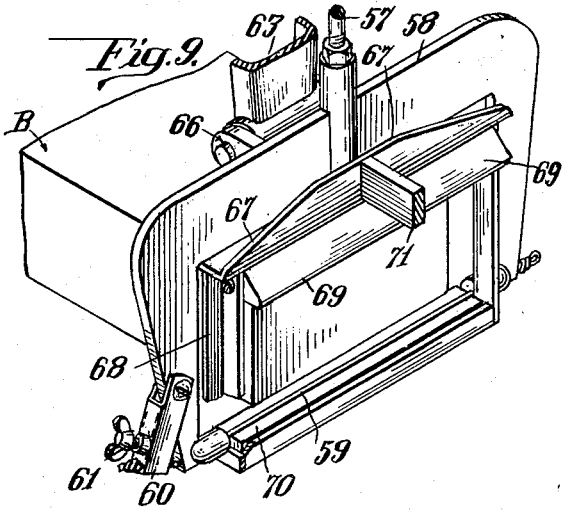
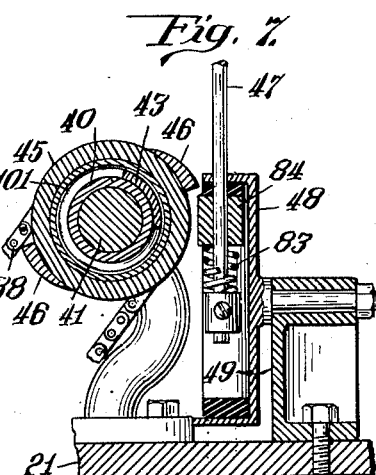
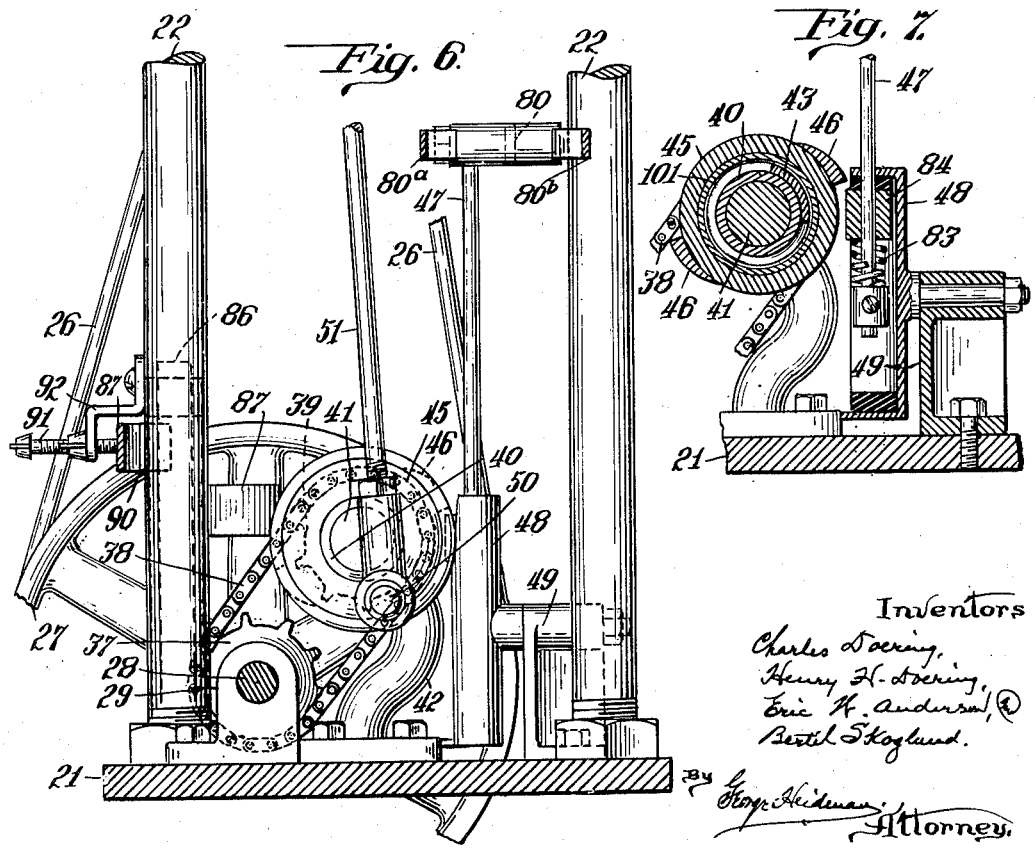
Inventors
Charles Doering,
Henry H. Doering,
Eric H. Anderson,
Bertil Skoglund.
By George Heideman
Attorney.

Patented May 21, 1940

2,201,391

UNITED STATES PATENT OFFICE 2,201,391

PLASTIC-MATERIAL CUTTING MACHINE

Charles Doering, Henry H. Doering, Eric W. Anderson, and Bertil Skoglund, Chicago, Ill.; said Anderson and said Skoglund assignors to said Charles Doering and said Henry H. Doering Application April 4, 1938, Serial No. 199,928

16 Claims. (Cl. 31—20)

Our invention relates to an automatic cutting machine for cutting preformed plastic material, such as butter, cheese, clay and the like and has for its object the provision of a power operated machine that is entirely automatic in operation and whereby the preformed or ribbon of plastic material will be more accurately cut than is the case with cutting devices as heretofore employed, with the result that greater uniformity in the cut portions or prints will be obtained.

The invention also has for its object the provision of a machine adapted equally well for cutting plastic material or butter of varying consistencies, namely whether soft or hard, and the cutting operation performed without material loss of the moisture desired to be retained in the formed prints of butter or cheese; the machine being intended for use with any suitable plastic material or butter working machine having a regulable discharge from which the butter or other plastic material issues in ribbon form of preselected dimensions as to width and thickness.

The objects and advantages of our invention will be readily comprehended from the detailed description of the accompanying drawings, wherein—

Figure 6 is a transverse sectional view taken on the line 6—6 of Figure 4 as viewed by the arrows.

Figure 7 is a cross sectional view taken on the line 7—7 of Figure 4, looking in the direction of the arrows.

Figure 8 is a detail sectional view of the power transmitting and trip mechanism, with the drive belt and pulley omitted.

Figure 9 is a detail perspective view of the cutter mechanism illustrating the same at the completion of its downward stroke with portions of the cutter frame guide broken away.

Figure 1:
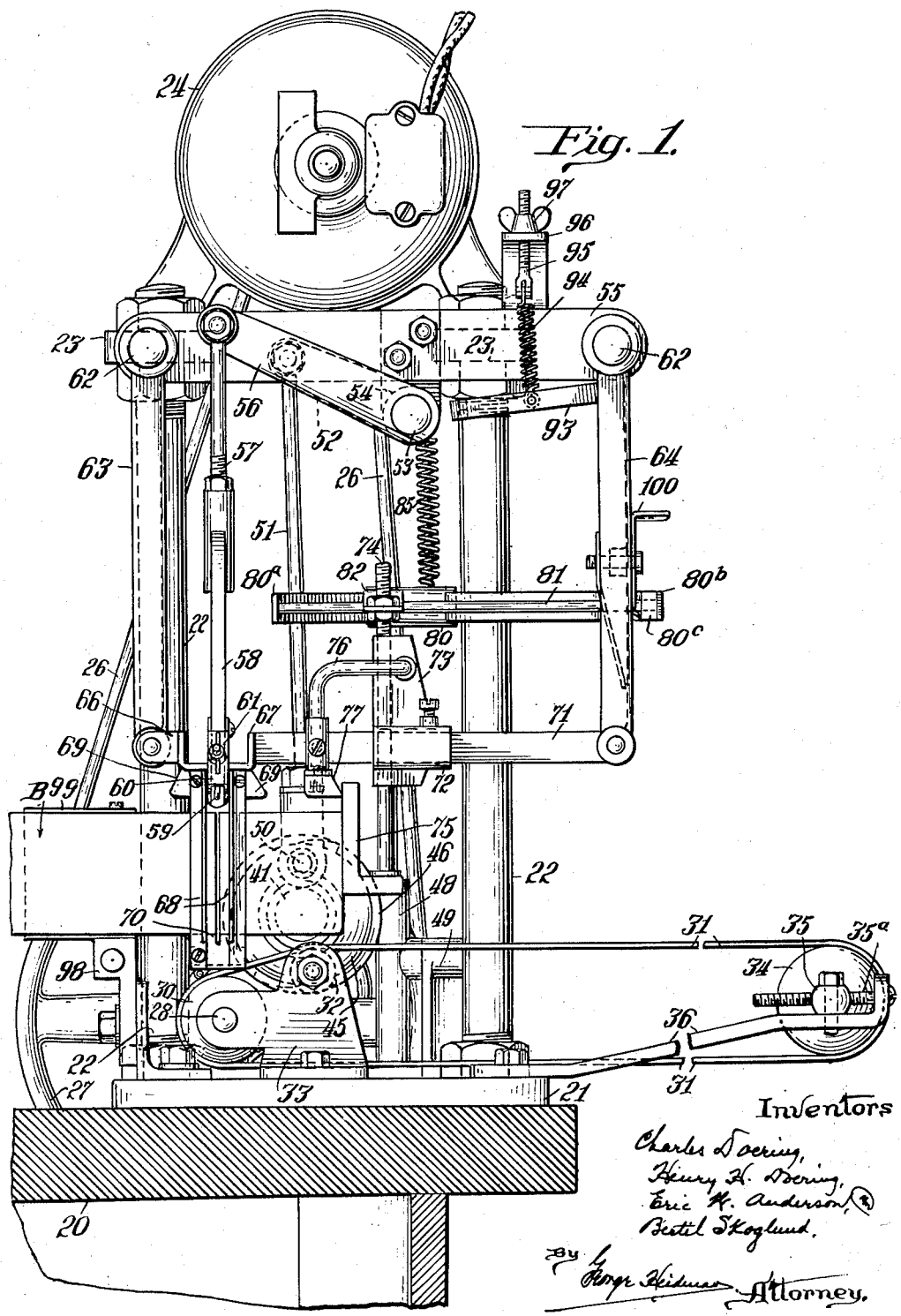
Figure 1 is a side elevation of our improved machine with the cutting mechanism in elevated position.
Figure 2:
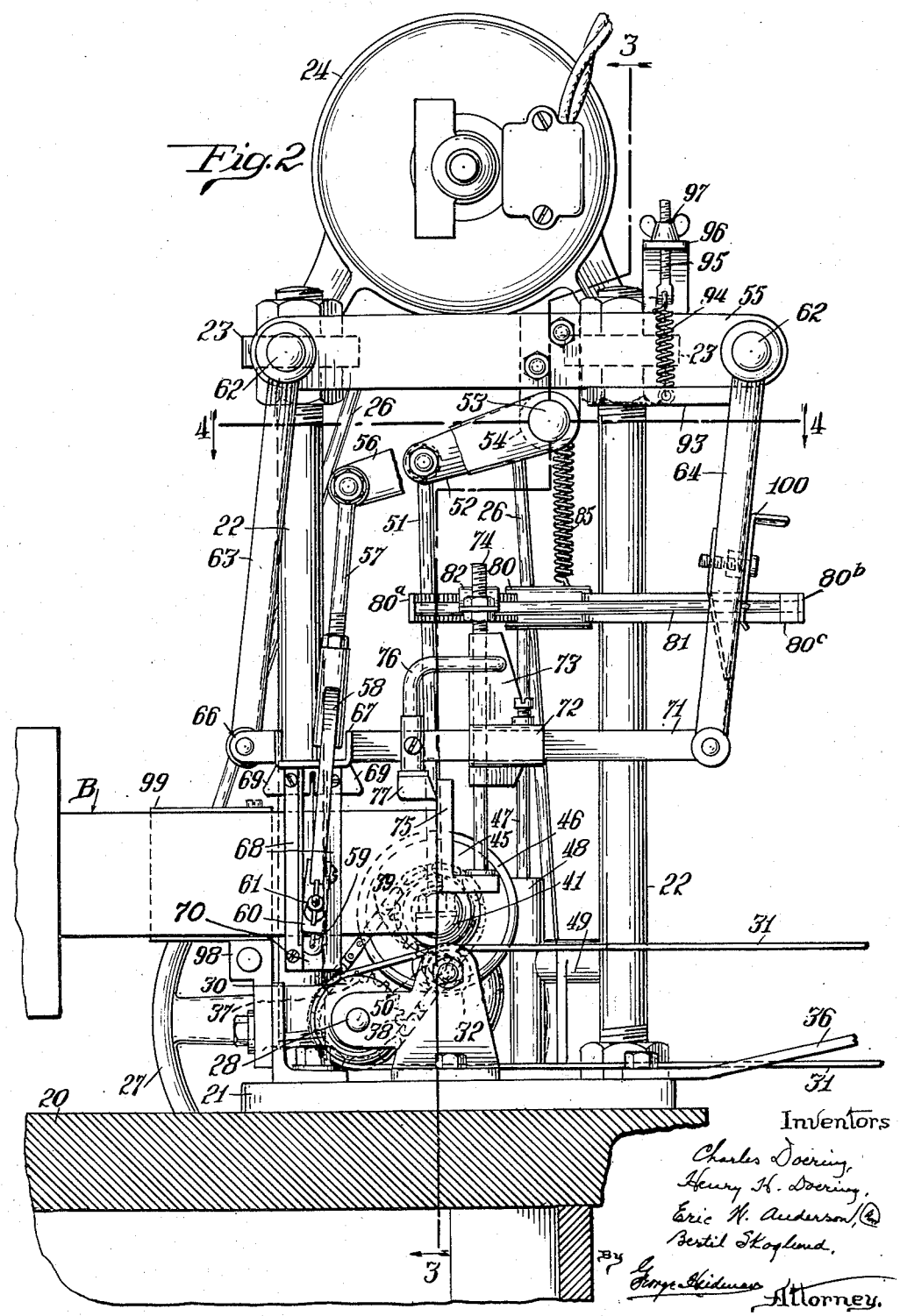
Figure 2 is a similar view illustrating the cutting mechanism at the completion of its downward cutting stroke.

Although our improved machine is adapted for use in automatically cutting any preformed plastic material as it issues from the working or forming machine, it is especially intended for use with a butter-forming machine from which the butter discharges in the form of a ribbon of predetermined thickness and width and this preformed ribbon of butter discharged onto a suitable conveyor whereby the material may be continuously delivered to our improved cutting machine.

Our improved machine contemplates any suitable supporting frame or platform generally indicated at 20; the supporting structure being of heighth commensurate with the elevation of the discharge end of the butter working or forming machine and its delivery belt.

Mounted on the supporting structure is a suitable base plate 21 to which the uprights 22 are secured and which in turn support the motor carrying bracket or plate 23 to which a suitable electric motor 24 is secured. The armature shaft of the motor is shown provided with a pulley 25 for driving belt 26 which drives the pulley 27 mounted on the end of a shaft 28 which is rotatably mounted in suitable bearings as at 29; the other end of the shaft 28 being provided with an enlargement or belt carrying roller 30 for driving the endless conveyor or belt 31. The conveyor or belt 31 is shown passing about a small roller 32 mounted in the upper end of the bracket 33 and also around a roller 34 whose trunnions are held in suitable bearing blocks 35 which are adjustably secured at the end of the frame extension 36, at 35ᵃ, so as to control the tautness of the conveyor belt 31.

The shaft 28 is provided with a sprocket wheel 37 which drives sprocket chain 38 which in turn drives a sprocket wheel 39 which is secured to a sleeve 40 which is rotatably mounted on the stub shaft 41 supported by bracket 42. Disposed about sleeve 40 is a spring clutch in the nature of a coil spring 43, one end whereof is secured in the collar 44, while the other end of the spring is secured in a collar 45; collars 44 and 45 being loosely mounted on sleeve 40. The coil spring 43 normally effects a frictional or gripping relation with the sleeve 40 and hence normally causes rotation of both collars 44 and 45. Collar 45 is surrounded by an adjustable cam collar 46; this cam collar 46 being rotatably adjustable on collar 45 and held in place by a suitable set-screw or bolt so that the diametrically opposite cam surfaces of collar 46 may be properly positioned or timed for actuating or depressing a vertically disposed rod 47 slidably mounted in the guide bracket 48 supported by bracket 49.

Collar 45 is provided with the eccentrically mounted pin 50 which controls vertical rod 51, whose upper end is connected with a crank-arm 52 secured to one end of rocker shaft 53, oscillatively mounted in bearing sleeve 54 which is secured to the top cross piece 55 (see Figure 3) and is provided at the rear with extensions that are secured to the uprights or posts 22. The other end of shaft 53 is provided with an arm 56 which is pivotally connected to a rod 57 whose lower end is secured to a cutter frame 58.

Figure 3:
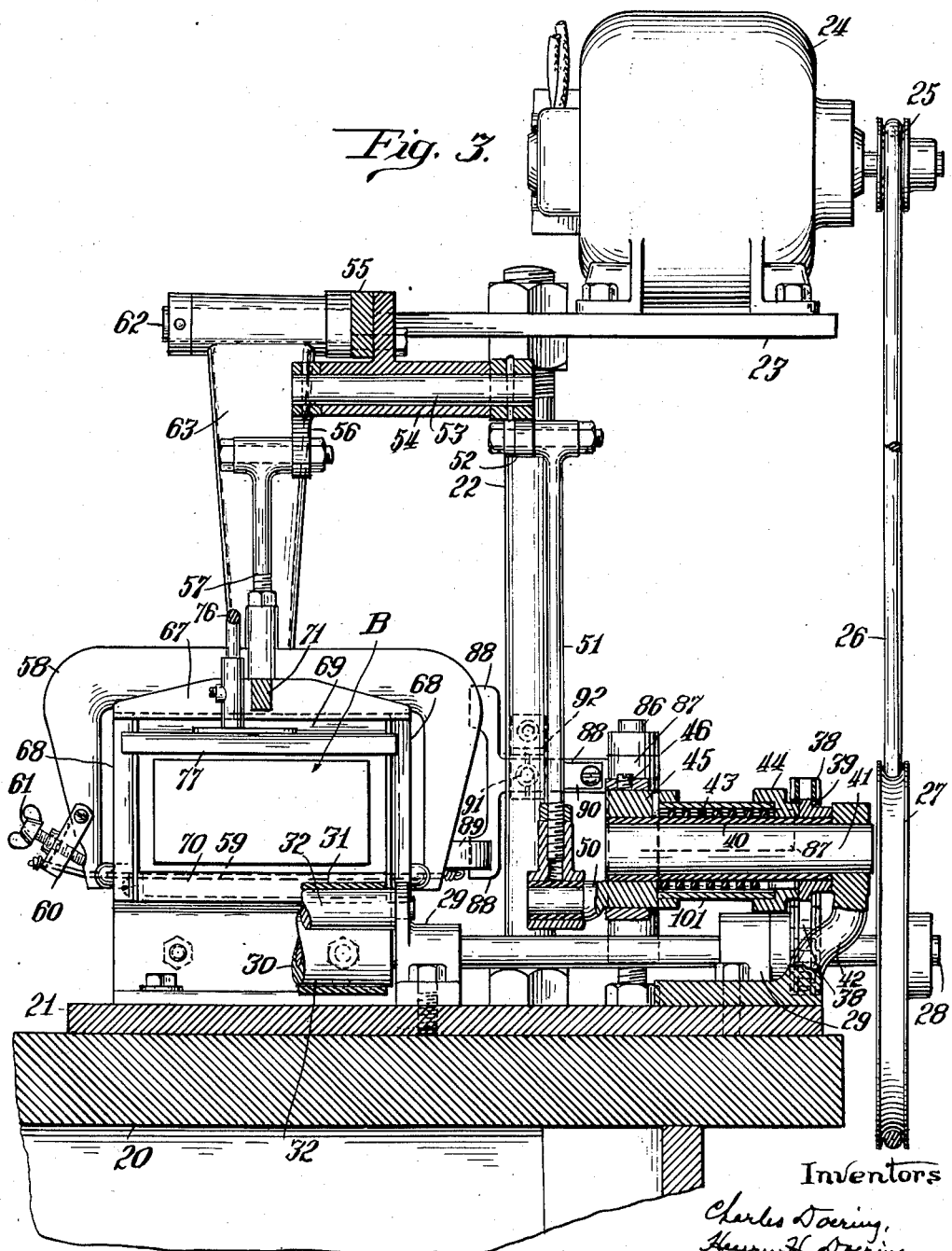
Figure 3 is a vertical sectional view taken substantially on the line 3—3 of Figure 2, looking in the direction of the arrows.

The cutter frame 58 is in the nature of a yoke of inverted U-shape as clearly shown in Figures 3 and 9, and the lower ends of the depending arms are provided with the cutting element or wire 59; one end whereof is immovably secured in place, while the other end of the wire extends through an opening in the lower end of the other arm and is secured to a tension providing member 60 which is pivotally secured to the arm of the cutter yoke or frame 58 and the free end of the tension member carries a thumb-screw 61 adapted to engage the cutter frame and cause the free end of member 60 to be moved farther away from the cutter frame and thereby place the cutting wire 59 under desired tension or to be drawn taut.

The heighth and width of the yoke or frame 58 are commensurate with the maximum dimensions of the ribbon of plastic material to be cut so as to permit the ribbon of plastic material or butter, shown at B, to pass through the yoke or frame 58 as shown in Figure 9 and permit the plastic ribbon to be cut during both the downward and the upward strokes of the cutter frame.

Figure 5:
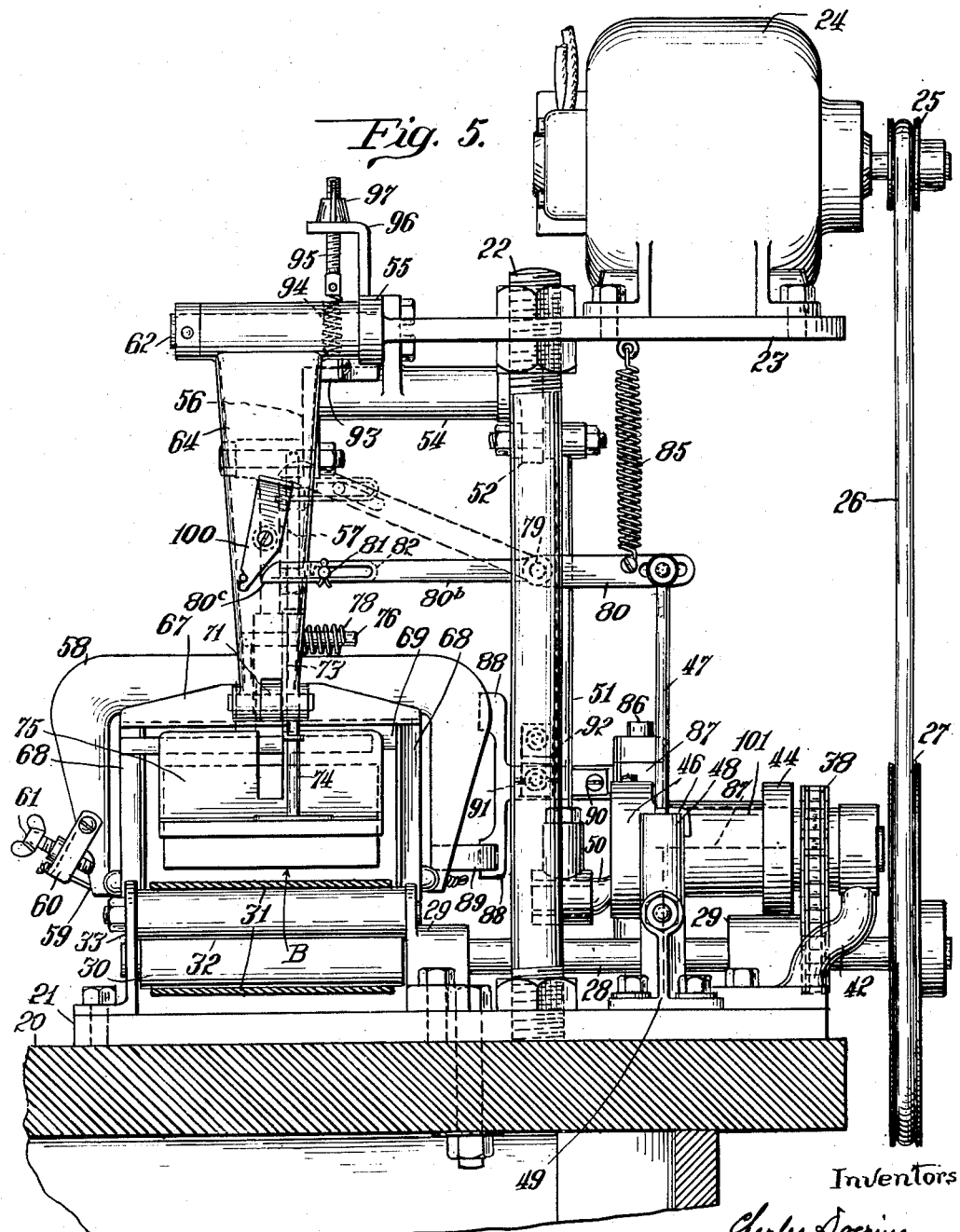
Figure 5 is a rear elevation of the material receiving side of the machine, as viewed from the right in Figure 1, with the conveyor shown in section.

The top cross piece 55, at opposite ends, is provided with a pair of trunnions 62, 62 on which the depending arms 63, 64 are swingingly mounted; the upper ends of the arms preferably flaring to afford wide bearings on the trunnions, see Figures 3 and 5.

The lower end of arm 63 has a laterally disposed cutter frame guide member 66 secured thereto, consisting of a comparatively wide channeled top plate portion 67 (see Figure 1) which extends through the yoke or cutter frame 58 with the sides of the channel disposed upwardly so as to permit slight relative movement between the cutter frame and the sides of the channel plate; and this channel plate 67 at each end is provided with a pair of depending arms 68 preferably united at their lower ends and spaced apart to permit the inturned wire holding portions of the cutter frame 58 to reciprocate therebetween. Immediately beneath the channel plate 67 we provide a stripper block 69 whose ends are secured to the depending arms 68 and its lower face provided with a lengthwisely disposed groove adapted to receive the cutting wire 59 at the limit of the upward stroke of the cutter frame; the block 69 being preferably of wood. The lower end of the cutter frame guide is also preferably provided with a stripper block 70.

The channel plate portion 67 is provided with a connecting and guide bar 71 whose opposite end is pivotally secured to the lower end of depending arm 64, as shown in Figure 1, thus causing the two arms 63, 64 to move in unison and to maintain the desired spaced relation between the lower ends of these arms; the arms 63, 64 being free to oscillate or to move in one direction through the action of the plastic material passing through the cutter yoke or frame and engaging a stop plate later to be described.

Adjustably secured on the bar 71 is a bearing member 72 having a vertically disposed sleeve portion 73 in which a vertically disposed rod 74 is loosely mounted. The lower end of rod 74 carries a stop plate 75 which is substantially coextensive with the width of the opening through the cutter frame and normally extends across the path of the oncoming ribbon of plastic material B as shown in Figure 1.

The bearing 73 loosely supports the bent rod 76 whose lower end carries a wiper strip or blade 77 which is arranged adjacent the forward face of the stop plate 75. The end of the rod 76 which extends through bearing element 73 is provided with a coil spring 78, one end whereof is secured to the rod 76 while the other end is held by the bearing or holding member 72; the torsion of the spring yieldingly maintaining the wiper strip or blade 77 adjacent the stop plate 75.

Pivotally secured to one of the uprights or posts 22 at 79 is a vertically oscillating frame 80 whose forward end is bifurcated as shown at 80ᵃ and 80ᵇ (see Figure 4) and these bifurcations are provided with the cross-rod 81 on which a clamp member or loop 82 is mounted so as to permit adjustment longitudinally of the rod 81.

The clamp member or loop 82 is also secured to the upper end of the stop plate carrying rod 74 so as to control the latter and induce vertical reciprocation of the rod and its stop plate when the bifurcated frame 80 oscillates.

The opposite or inner end of the frame 80 is secured to the vertically disposed rod 47 whose lower end is vertically slidable in the bracket 48; the lower end of the rod being provided with a small coil or cushion spring 83 which yieldingly supports a collar 84 also secured to the rod 47 and which collar extends into the path of the cam action producing surfaces or shoulders of cam collar 46 (see Figure 7). With the cam collar 46 rotating in clockwise direction in Figure 7, it is apparent that the shoulders or cam surfaces will engage the collar 84 and cause rod 47 to be moved downwardly sufficiently to let the cam surface or shoulder slip or move past the collar 84; such downward movement of the rod 47 causing the bifurcated frame 80 to be tilted which in turn elevates the stop plate 75 and its forward face to be wiped by the wiper strip or blade 77. As soon as the cam surface of collar 46 has become disengaged from the collar 84 on rod 47, the latter and the frame 80 will be returned to normal position through the action of a spring 85 whose upper end is secured to the motor supporting plate or arm 23, see Figure 5.

Pivotally secured on the vertically disposed post 86 so as to swing horizontally is a clutch release or trip lever 87, whose one end bears against the clutch collar 44 so as to arrest its rotation, induced by spring 43, when a shoulder 44ᵃ on collar 44 contacts the lever 87. The momentary holding of collar 44—to which one end of clutch spring 43 is secured—provides an untwisting movement of spring 43 out of frictional gripping relation with the drive sleeve 40 while the latter continues to rotate, thus also preventing rotation of crank-pin collar 45 and its associated collar 46.

The opposite end of clutch release lever 87 extends beyond the supporting post 22 and terminates in a pair of vertically spaced portions 88, 88, see Figures 3 and 5, which are disposed adjacent the swinging cutter frame 58. The cutter frame 58 is provided with a spring strip or detent 89, adapted to engage the enlarged upper and lower ends of the vertically spaced portions 88, 88, when the cutter frame 58 swings or moves to the right in Figure 1, namely in the direction of movement of the plastic material induced by the endless conveyor 31. The engagement of detent 89 with either end 88 of lever 87 causes the opposite end of the lever 87 to be moved out of holding engagement with the shoulder (see Figure 8) of clutch collar 44, which permits the collar to again rotate through the action of clutch spring 43 which assumes its normal contracted and binding relation with drive sleeve 40.

Figure 4:
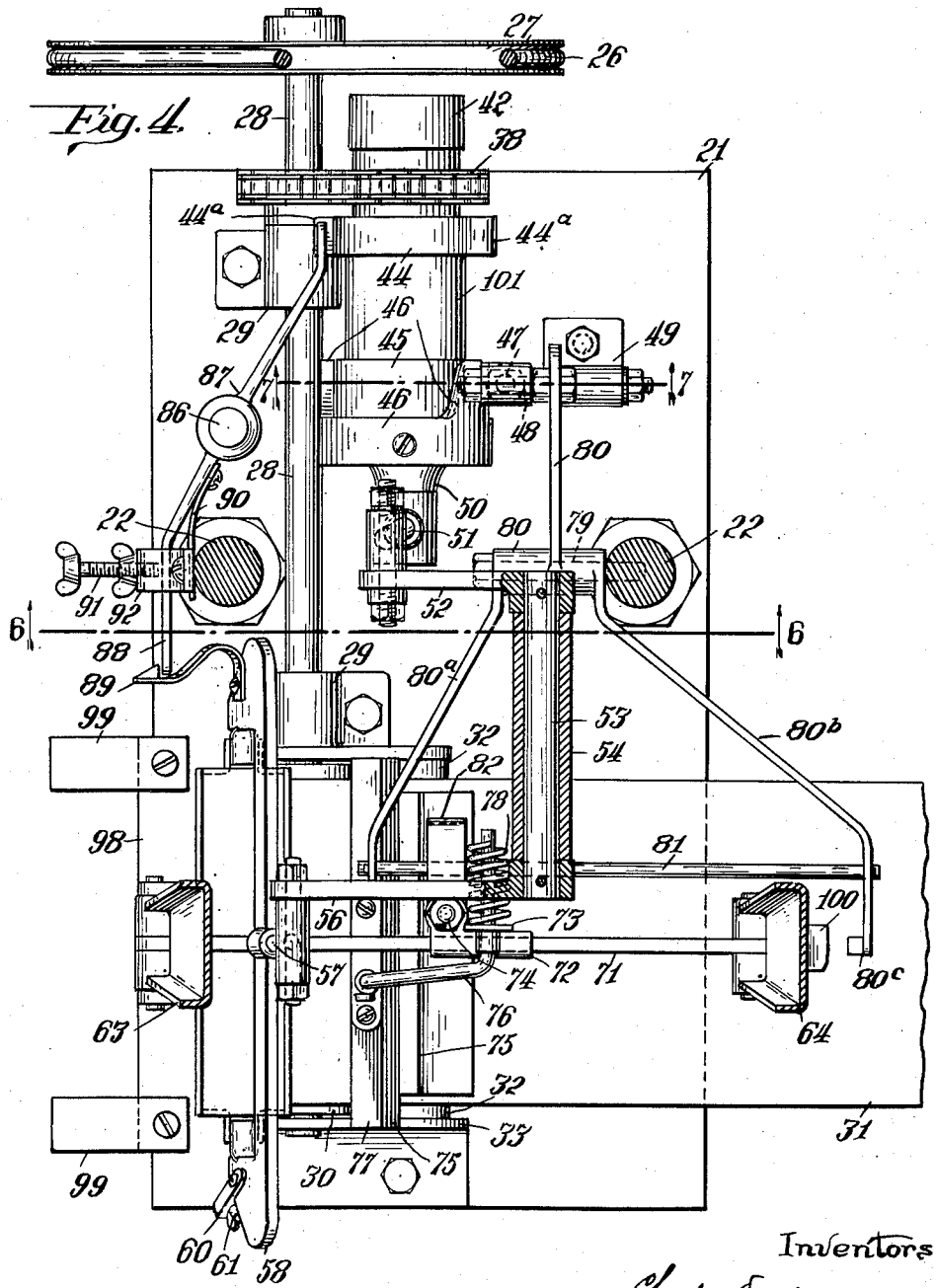
Figure 4 is a cross sectional view taken on the line 4—4 of Figure 2, looking downwardly.

The normal position of release lever 87, namely with its end in engagement with clutch collar 44 is induced by spring 90, one end whereof is shown secured to the lever 87, while the free end of the spring 90 bears against the vertical standard or post 22, see Figure 4.

The outward pressing action of the spring 90 is controlled by the stop mechanism consisting of the adjustable thumb-screw 91, which is threaded through the bracket 92, which is secured to the post 22, see Figure 6.

The depending swinging arm 64 of the cutter frame control mechanism is provided with an arm 93, whose free end is bent laterally to engage beneath the stationary cross-piece 55, see Figure 1, to act as a stop against the action of a spring 94 which tends to return the swinging frame toward the left in Figure 1, namely the initial cutting position of the cutter mechanism. The spring 94 at its upper end is secured to a threaded pin 95 which extends through the overhanging bracket 96, and the upper end of the pin is provided with a thumb-nut 97 whereby the pin is held in place and the tension of the spring 94 controlled.

The material receiving end of the machine and in the plane of the initial or receiving end of conveyor 31 is provided with a material guiding throat consisting of the horizontal block or plate 98 on which are mounted the two vertically disposed blocks 99, 99, see Figure 4, which guide the oncoming ribbon of plastic material B onto the endless conveyor.

The swing arm 64 is shown provided with a pivotally mounted stop detent 100, the upper end whereof is disposed outwardly into the upward path of the extended end 80c of bifurcation 80b of the tiltable frame 80 (see Figure 4) which controls the stop-plate 75, when the swinging frame 63, 64 has been moved with the traveling material. Detent 100 is pivoted to swing back to vertical position and its upper end moves sufficiently to allow the end of frame 80 to swing upwardly past the detent, which immediately swings back to normal position and momentarily holds frame 80 and the stop-plate in elevated position until frame 63, 64 swings back to normal, at which time frame 80 drops to its normal position.

In operation, the preformed ribbon of plastic material B is guided by the plates or blocks 98, 99, 99 onto the conveyor and is conveyed through the path of the cutter mechanism; the conveyor 31 being driven by roller 30 secured on the drive shaft 28 which is driven by motor 24 through the medium of the belt 26 and pulley 27. The sprocket chain 38 drives a sprocket 39 secured to the end of sleeve 40 and this sleeve, through clutch spring 43, rotates the collar 44 and the crank-pin collar 45. Rotation of crank-pin collar 45 causes reciprocation of rod 51 which in turn induces oscillations of the crank-arms 52, 56 and causes the cutter frame 58 to move vertically through its cutting strokes—the cutting of the material taking place during both downward and upward strokes of the cutter frame. The length of the prints to be cut is controlled by the stop plate 75 which has previously been set or adjusted on the connecting or guide bar 71; the stop plate 75 being normally disposed in the path of the oncoming material and moving therewith until the cam member 46 (secured on rotating crank-pin collar 45) depresses rod 47, thereby tilting the bifurcated end of frame 80 upwardly, which lifts the stop-plate carrying rod 74 upwardly and moves the stop-plate out of the path of the material, allowing the cut portion to move along with the conveyor. The pressure of the material against the stop-plate 75 causes the frame members 63, 64 with the guide and connecting bar 71 (to which the stop-plate bearing is fixedly secured) to swing in the direction of travel of the material so as to avoid improper pressure on the material; the stop-plate holding stem or rod 74 having a slidable controlling connection with the cross-rod 81 of the stop-plate lifting frame 80. As the wiper plate 77 remains stationary, so far as the vertical movements of stop-plate 75 are concerned, any material that may have a tendency to slightly adhere to the stop plate will be wiped off the stop-plate; the wiper-plate 77 also tending to hold the forward end of the material against movement upwardly with the stop-plate.

The movement of the frame 63, 64 causes the detent 89 to engage either the upper or lower bifurcations 88, 88 (depending upon whether the cutter frame is at the top or bottom of its stroke) thereby tilting clutch release lever 87, out of holding contact with a shoulder 44a on clutch collar 44 and permitting the clutch spring 43 to contract into frictional relation with the drive sleeve 40 and induce rotation of the crank-pin collar 45 and reciprocation of the cutter frame 58 through the action of the connecting rod 51, crank arms 52, 56 and connecting rod 57.

In order to protect the clutch spring 43, we employ an outer sleeve or shell 101, held in place by collars 44 and 45; the internal diameter of the sleeve 101 being such as not to interfere with the expansion or uncoiling movement of the spring 43.

While our improved machine is especially adapted for use in connection with butter working machines as at present in use, to which they may be attached if desired, the machine is equally well adapted for continuously cutting any preformed ribbon of plastic material.

We have described the specific embodiment of the invention illustrated in the drawings in terms employed for purposes of description and not as terms of limitation, as structural modifications are possible and may be made without, however, departing from the spirit of the invention as defined in the appended claims.

What we claim is:

1. A cutting machine of the character described comprising a supporting base with a material receiving throat at one end and upstanding posts provided with top cross-pieces; a power shaft; an endless conveyor in alignment with the throat; means operatively connected with the power shaft for driving said conveyor; a guide frame swingingly suspended from the upper end of the posts; a cutter frame vertically slidable in said guide frame and adapted to move therewith; crank-arms oscillatingly mounted above the cutter frame, with one arm pivotally connected with the cutter frame, while the other crank-arm has a connecting rod pivotally connected therewith; driving mechanism involving a drive member operatively connected with the power shaft, a collar loosely mounted on one end of said member and provided with a crank-pin to which the lower end of said connecting rod is secured, a cam collar loosely mounted on the other end of said drive member, and a clutch spring contracted about said drive member so as to normally revolve therewith, one end of said spring being secured to said crank-pin collar while the other end of said spring is connected with said cam collar, whereby both collars are rotated with said drive member; a vertically movable stop-plate arranged in the path of the oncoming material and laterally movable with said guide frame; means operatively intermediate of the crank-pin collar and said stop-plate whereby the latter is moved out of the path of the material at prearranged moments in the rotation of the crank-pin collar; means whereby said cam collar is held against rotation at predetermined moments in the rotation of the crank-pin collar; and means whereby said last means is moved out of cam collar holding position at predetermined moments in the movement of the cutter-frame.

2. A cutting machine of the character described comprising a power shaft; an endless conveyor driven thereby and adapted to receive the material to be cut; a swingingly mounted guide frame adapted to move lengthwise of the conveyor; a stop-plate adjustably secured to the guide frame and disposed in the path of the oncoming material; a cutter frame vertically slidable in said guide frame and adapted to move therewith; a rotatable drive member having operative connection with the power shaft; means operatively intermediate of the drive member and the cutter frame whereby the latter is reciprocated and involving a crank-pin member associated with the drive member; clutch mechanism operatively associated with the drive member and said crank-pin member whereby the latter is caused to rotate with the drive member; means whereby the operative relation between the clutch mechanism and said drive member is interrupted at prearranged moments in the rotation of the crank-pin member and rotation of the latter prevented; means operatively intermediate of said stop-plate and the crank-pin member whereby the stop-plate is moved out of the path of the material at prearranged moments in the rotation of the crank-pin member; and means intermediate of the cutter frame and said second mentioned means whereby the latter is moved into non-controlling position and the operative relation between said clutch mechanism and said drive member re-established.

3. A cutting machine of the character described provided with a pathway for the material to be cut and comprising a vertically reciprocable cutter frame adapted to be reciprocated through said pathway; a vertically movable stop-plate disposed in said pathway adapted to move with the oncoming material; a rotatable drive member; a crank-pin collar loosely mounted on said drive member; a cam collar loosely mounted on said drive member in spaced relation with the crank-pin collar; a coil-spring contracted about said drive member so as to rotate therewith, one end of said spring being secured to the crank-pin collar while the other end of the spring is secured to said cam collar so as to induce both collars to rotate therewith; an oscillatable lever adapted to effect holding engagement with said cam collar at prearranged intervals in the rotation of said collar and thereby expand said spring out of its contracted relation with the drive member and likewise prevent rotation of the crank-pin collar; means operatively intermediate of the crank-pin collar and said cutter frame whereby the latter is reciprocated; and means operatively intermediate of the crank-pin collar and said stop-plate whereby the latter is moved out of the pathway at prearranged moments in the rotation of said crank-pin collar.

4. A plastic material cutting machine provided with a material receiving pathway provided with an endless conveyor and comprising an oscillatingly mounted guide frame adapted to move lengthwise of said pathway; means whereby said frame is returned to normal position; a stop-plate carried by said frame and adjustable in a direction lengthwise of the pathway whereby the length of the cut material is determined; a cutter frame reciprocatingly mounted in said guide frame; a rotatable drive member; a crank-pin collar loosely mounted on said drive member; rocker mechanism whereby said cutter frame is reciprocated through the pathway; a connecting rod between the rocker mechanism and said crank-pin collar; a cam or stop collar loosely mounted on said drive member in spaced relation with said crank-pin collar; a coil spring normally contracted about said drive member, with one end secured to said crank-pin collar, while its other end is secured to said stop collar, whereby both collars are rotated with said drive member; means operatively intermediate of the stop-plate and said crank-pin collar whereby the stop-plate is lifted out of the path of the oncoming material at prearranged intervals in the rotation of said crank-pin collar; means normally engaging said cam or stop collar whereby the latter is periodically held against rotation and said coil spring expanded out of driving contact with the drive member; and means whereby said last mentioned means are moved out of stop collar engagement when said guide frame with the cutter frame have oscillated a prearranged degree in one direction.

5. In a cutting machine of the character described, a vertically movable cutter frame; a rocker shaft having crank-arm connection with said cutter frame so as to cause reciprocation of the latter; a rotatable drive member; a loosely mounted rotatable crank-pin collar having link connection with said rocker shaft; a loosely mounted cam or stop collar arranged in spaced relation with said crank-pin collar; a coil spring contracted about said drive member so as to normally rotate therewith, one end of said spring being connected with the crank-pin collar while the other end of said spring is connected with said cam or stop collar whereby both collars are caused to rotate with the spring and said drive member; and means whereby said cam or stop collar at prearranged moments in its rotation is held against further rotation and said coil spring thereby expanded out of operative relation with said drive member and said crank-pin collar held against rotation.

6. In a cutting machine of the character described, a cutter frame; a material engaging stop-plate adapted to move vertically out of contact with the material; a rotating drive member; a pair of collars loosely mounted on said drive member in spaced relation with each other; a coil spring contracted about said drive member so as to rotate therewith, one end of said spring being connected to each collar so as to cause the collars to rotate with the spring; means intermediate of one of the collars and said cutter frame whereby the latter is actuated; means intermediate of said last mentioned collar and the stop-plate whereby the latter is moved out of contact with the material during predetermined moments in the rotation of said collar; and spring controlled means adapted to effect holding engaging with the other of said pair of collars at prearranged moments in its rotation and thereby expand said spring out of operative relation with the drive member and prevent further rotation of the first mentioned collar.

7. In a cutting machine of the character described, a power shaft; an endless conveyor driven by said power shaft; a cutter frame reciprocatingly mounted adjacent said conveyor; oscillatable means for reciprocating said cutter frame; a stop-plate arranged above the conveyor in the path of the oncoming material and adapted to move upwardly out of the path of the material; tiltable means for lifting said stop-plate; a drive member operatively connected with the power shaft so as to rotate therewith; a clutch mechanism associated with said drive member for imparting movement to said oscillatable means and to said tiltable means; and a spring controlled lever whereby the clutch mechanism is declutched from said drive member at prearranged moments in the rotation of the drive member.

8. In a cutting machine of the character described, a spring controlled laterally swinging guide frame; a stop-plate adjustably mounted on said frame and arranged in the path of the material, the pressure whereof oscillates said frame; a cutter frame carried by said guide frame and vertically movable therein, said cutter frame having adjustable cutter element holding means; means whereby the cutter frame is actuated; means whereby the stop-plate is intermittently moved out of the path of the material; a rotating drive member provided with loosely mounted collars at opposite ends, one of said collars being adapted to operate said cutter frame actuating means and also adapted to actuate said stop-plate moving means; a coil spring contracted about said drive member so as to rotate therewith, the ends of the spring being secured to said collars to induce their rotation; and means adapted to effect holding engagement with the other of said collars at prearranged periods in its rotation and thereby expand the spring out of operative engagement with the drive member, said means being moved out of its holding engagement when the cutter frame has moved laterally a predetermined degree with the guide frame.

9. In a cutting machine of the character described, a spring controlled laterally swinging guide frame; means for limiting the movement of said guide frame in one direction; a stop-plate carried by said frame and adjustable lengthwise of the path of the material to be cut, said stop-plate being arranged in the path of the material whereby pressure of the material thereagainst induces swinging movement of said guide frame with the stop-plate, said stop-plate being adapted to be moved upwardly out of the path of the material; a wiper-member carried by the swinging frame and disposed adjacent the forward face of the stop-plate; a cutter frame vertically slidable in said guide frame and provided with a cutter element adapted to cut the material during the downward and upward strokes of the cutter frame; rocker means whereby said cutter frame is reciprocated; lift mechanism whereby said stop-plate is moved out of contact with the material; a rotating drive member; means associated with the drive member so as to normally rotate therewith, said means being adapted to oscillate said rocker means and at prearranged moments in its rotation to tilt said lift mechanism; clutch mechanism for normally maintaining operative relation between the drive member and said associated means; and means for automatically declutching said clutch mechanism at prearranged periods in the rotation of the means associated with the drive member, said means being adapted to be moved out of declutching position when the cutter frame has been moved laterally by the guide frame a predetermined extent.

10. In a cutting machine of the character described, a laterally movable guide frame; a stop-plate carried by the frame and adjustable lengthwise of the path of the material to be cut to determine the lengths of the portions of material to be cut, said stop-plate being movable out of the path of the material; a cutter frame associated with said guide frame and provided with a removable cutter element; a power imparting drive member; means whereby the cutter frame is actuated; means associated with said last mentioned means whereby the stop-plate is moved out of the path of the cut material at prearranged periods in the actuation of the cutter frame; clutch mechanism normally providing operating connection between said cutter frame actuating means and the drive member; means whereby the clutch mechanism is moved into declutching condition when the cutter frame reaches the ends of its cutting strokes; and means whereby said last means is moved out of clutch controlling position when the cutter frame has moved laterally with the guide frame to a predetermined extent.

11. In a cutting machine of the character described, an endless material conveyor; a guide frame adapted to be moved lengthwise of the conveyor; a stop-plate carried by the frame and adjustable lengthwise of the conveyor whereby the length of the portions of material to be cut is determined, said stop-plate being movable out of the path of the cut material; a cutter frame adapted to move with the guide frame; a drive member; means whereby said cutter frame is actuated; clutch mechanism normally providing operating connection between said last means and said drive member; means associated with said last means whereby the stop-plate is moved out of the material path at the end of the cutting stroke of the cutter frame; means whereby the clutch mechanism is held in declutched condition when the cutter frame reaches the end of its cutting strokes; and means whereby said last means is moved out of operative relation with the clutch mechanism when the cutter frame has moved lengthwise of the conveyor a predetermined degree.

12. In a cutting machine of the character described, an endless conveyor for the material; power imparting means; a cutter frame adapted to be reciprocated across the path of the material on said conveyor and movable with the material; means normally arranged in the path of the material on the conveyor so as to be moved thereby, said means being adjustable lengthwise of the conveyor to determine the length of the cut material; means for reciprocating said cutter frame; means, having operative association with said last means, whereby the second mentioned means are moved out of the path of the material when the cutter frame has completed a cutting stroke; clutch mechanism for establishing operative relation between the power imparting means and the cutter frame reciprocating means; automatic means whereby the clutch mechanism is declutched at predetermined moments in the reciprocation of the cutter frame; and means whereby said last means are moved out of clutch control position when the cutter frame has moved with the material a prearranged extent.

13. In a cutting machine of the character described provided with a cutter frame and material engaging means normally arranged in the path of the material; a rotating drive member; a pair of collars loosely mounted at opposite ends on said drive member; a coil spring contracted about said drive member so as to rotate therewith, the ends of said spring being secured to said collars so as to cause the latter to rotate with the spring and the drive member, one of said collars being adapted to actuate the cutter frame and the material engaging means, while the other collar is provided with engaging surfaces at prearranged points; and means adapted to effect holding engagement with said surfaces on the last mentioned collar when the latter has rotated a predetermined degree, whereby the coil spring is expanded out of contracted relation with said drive member and further rotation of the first mentioned collar prevented.

14. In a cutting machine of the character described, a cutter frame adapted to be reciprocated across the path of the material moving through the machine, said cutter frame being adapted to move with the material during its cutting strokes; a rotating drive member; a pair of collars loosely associated with said drive member; a coil spring contracted about said drive member so as to rotate therewith, the ends of the spring being secured to said collars to induce rotation of the latter, one of said collars being adapted to actuate the cutter frame, while the other collar at prearranged points is provided with engaging surfaces; a spring controlled lever normally adapted to engage said surfaces of the last mentioned collar and hold the collar against rotation, whereby said spring expands out of contracted relation with said drive member and further rotation of the cutter frame actuating collar prevented; and means whereby said lever is moved out of clutch collar holding position when the cutter frame has moved a predetermined extent with the material.

15. In a cutting machine of the character described, a cutter frame adapted to reciprocate across the path of the material to be cut; means arranged in the path of the material for inducing the cutter frame to move lengthwise of the path of the material; a rotating drive member; means, whereby the cutter frame is actuated, normally in operative relation with said drive member; means operatively associated with said last mentioned means whereby said first mentioned means are moved out of the path of the material; a rotating drive member; automatic clutch mechanism for establishing operative relation between said second mentioned means and said drive member; a pivoted lever adapted to effect a declutching of the clutch mechanism at predetermined moments in the movement of said second mentioned means; and means whereby said lever is moved out of declutching position when the cutter frame has been moved a predetermined extent lengthwise of the material.

16. In a cutting machine of the character described, a material conveyor; an oscillating guide frame; means carried by said frame, disposed in the path of the material on said conveyor, whereby said frame is caused to move in the direction of travel of the material, said means being movable out of the path of the material; a wiper blade carried by said guide frame and yieldingly associated with said means; a cutter frame vertically slidable in the guide frame and provided with regulable cutting element holding means; means whereby the cutter frame is reciprocated; tiltable means whereby said first mentioned means is moved out of the path of the cut material; a rotating drive member; a pair of loosely mounted rotatable collars, one of said collars having operative connection with the cutter frame reciprocating means and adapted to actuate said tiltable means at predetermined moments in the rotation of said collar, while the other collar is provided at prearranged points with engaging surfaces; a spring coiled about said drive member in contracting gripping relation therewith so as to rotate with said member, one end of the spring being secured to the first mentioned collar so the latter rotates therewith while the other end of the spring is secured to the second mentioned collar to cause the latter to rotate with the spring; a pivoted lever, one end whereof is adapted to engage said engaging surfaces of the second mentioned collar and to hold said collar against rotation, said spring uncoiled out of gripping relation with the drive member and further rotation of said first mentioned collar prevented; and a detent carried by the cutter frame and adapted to engage the other end of said lever at either end of the reciprocating strokes of the cutter frame when the latter, through the action of the guide frame, has moved a predetermined extent with the material.

CHARLES DOERING.
HENRY H. DOERING.
ERIC W. ANDERSON.
BERTIL SKOGLUND.